United States Patent
Kuwano

(10) Patent No.: US 8,294,929 B2
(45) Date of Patent: Oct. 23, 2012

(54) IMAGE FORMING APPARATUS, IMAGE FORMING SYSTEM, METHOD OF PRINTING SAMPLE PRINT, AND COMPUTER PROGRAM PRODUCT

(75) Inventor: Shuko Kuwano, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1205 days.

(21) Appl. No.: 12/030,469

(22) Filed: Feb. 13, 2008

(65) Prior Publication Data

US 2008/0231888 A1    Sep. 25, 2008

(30) Foreign Application Priority Data

Mar. 19, 2007 (JP) ................. 2007-069949

(51) Int. Cl.
- G06F 3/12 (2006.01)
- G06K 15/00 (2006.01)
- B65H 33/04 (2006.01)
- G03G 15/14 (2006.01)

(52) U.S. Cl. ...... 358/1.15; 358/1.1; 358/1.14; 358/1.16; 358/1.13; 270/58.28; 270/58.11; 399/9

(58) Field of Classification Search ............... 358/1.16; 399/9; 400/70; 270/58.28
See application file for complete search history.

(56) References Cited

U.S. PATENT DOCUMENTS

| | | | |
|---|---|---|---|
| 6,145,826 A * | 11/2000 | Kawata | 270/58.28 |
| 6,168,145 B1 * | 1/2001 | Tanaka et al. | 270/58.11 |
| 6,685,368 B1 * | 2/2004 | Beckman | 400/70 |
| 6,906,813 B1 * | 6/2005 | Tuchitoi et al. | 358/1.14 |
| 7,929,173 B2 * | 4/2011 | Tuchitoi et al. | 358/1.16 |
| 2005/0141030 A1 * | 6/2005 | Tuchitoi et al. | 358/1.16 |
| 2006/0165421 A1 * | 7/2006 | Yamazaki | 399/9 |
| 2007/0273914 A1 * | 11/2007 | Hosoda | 358/1.14 |
| 2008/0003011 A1 * | 1/2008 | Unno | 399/82 |

FOREIGN PATENT DOCUMENTS

| | | |
|---|---|---|
| JP | 8-101542 | 4/1996 |
| JP | 8-146835 | 6/1996 |
| JP | 2000-35730 | 2/2000 |
| JP | 2003-87560 | 3/2003 |
| JP | 2004-284323 | 10/2004 |
| JP | 2005-94524 | 4/2005 |
| JP | 2005-234328 | 9/2005 |
| JP | 2006-3568 | 1/2006 |
| JP | 2006-102990 | 4/2006 |
| JP | 2006-264003 | 10/2006 |
| JP | 2007-41353 | 2/2007 |

OTHER PUBLICATIONS

Office Action issued May 24, 2011 in Japan Application No. 2007-069949.

* cited by examiner

*Primary Examiner* — Akwasi M Sarpong
(74) *Attorney, Agent, or Firm* — Oblon, Spivak, McClelland, Maier & Neustadt, L.L.P.

(57) ABSTRACT

An image forming apparatus is able to select a paper-delivery destination for a print output. The image forming apparatus includes a print-process managing unit that divides a print job into print processes and controls a print output; and a sample-print-output controlling unit that controls execution of a sample print output by causing, in response to a sample-print-output request, an interrupt of a duplicate of a predetermined print process of the print job, with the paper-delivery destination being changed, to be handled by the print-process managing unit.

15 Claims, 14 Drawing Sheets

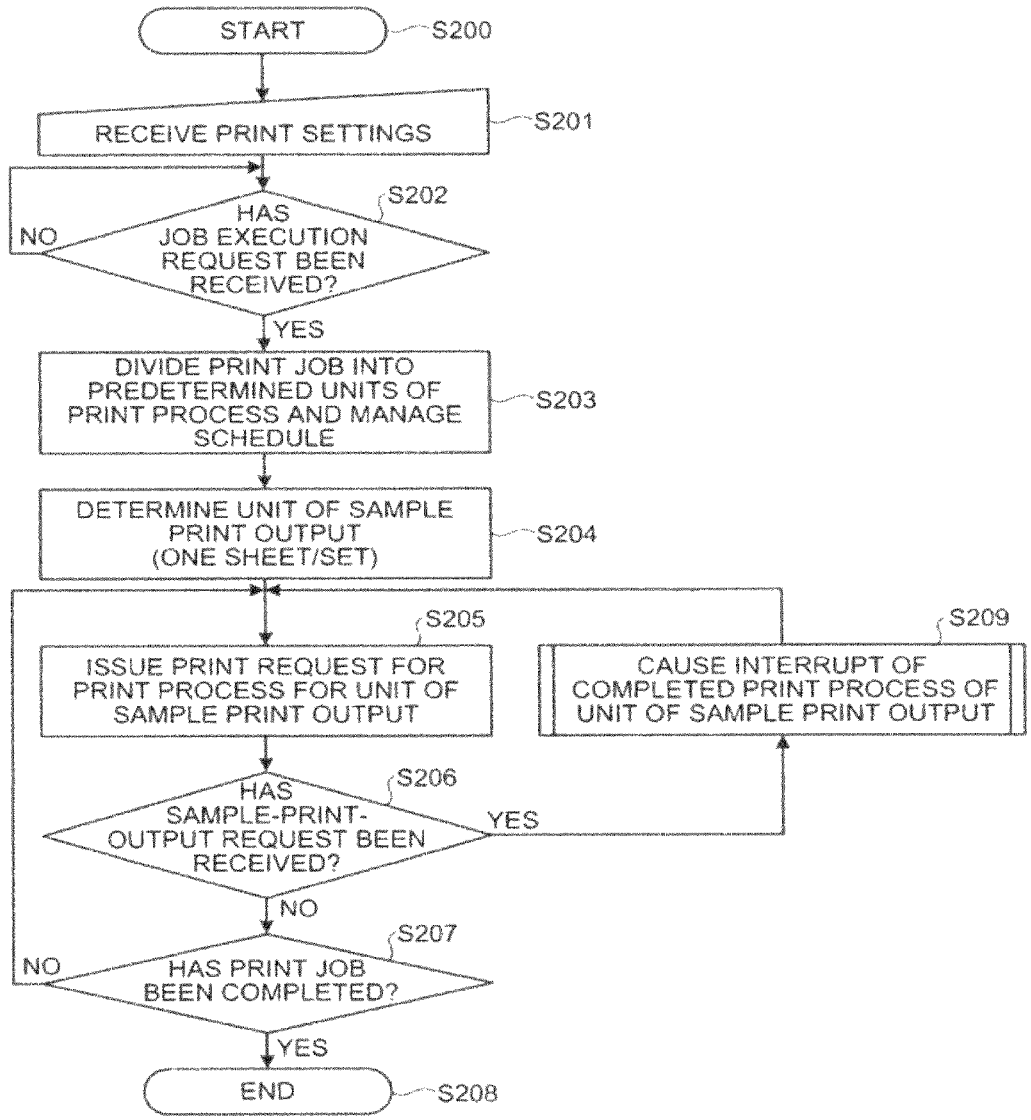

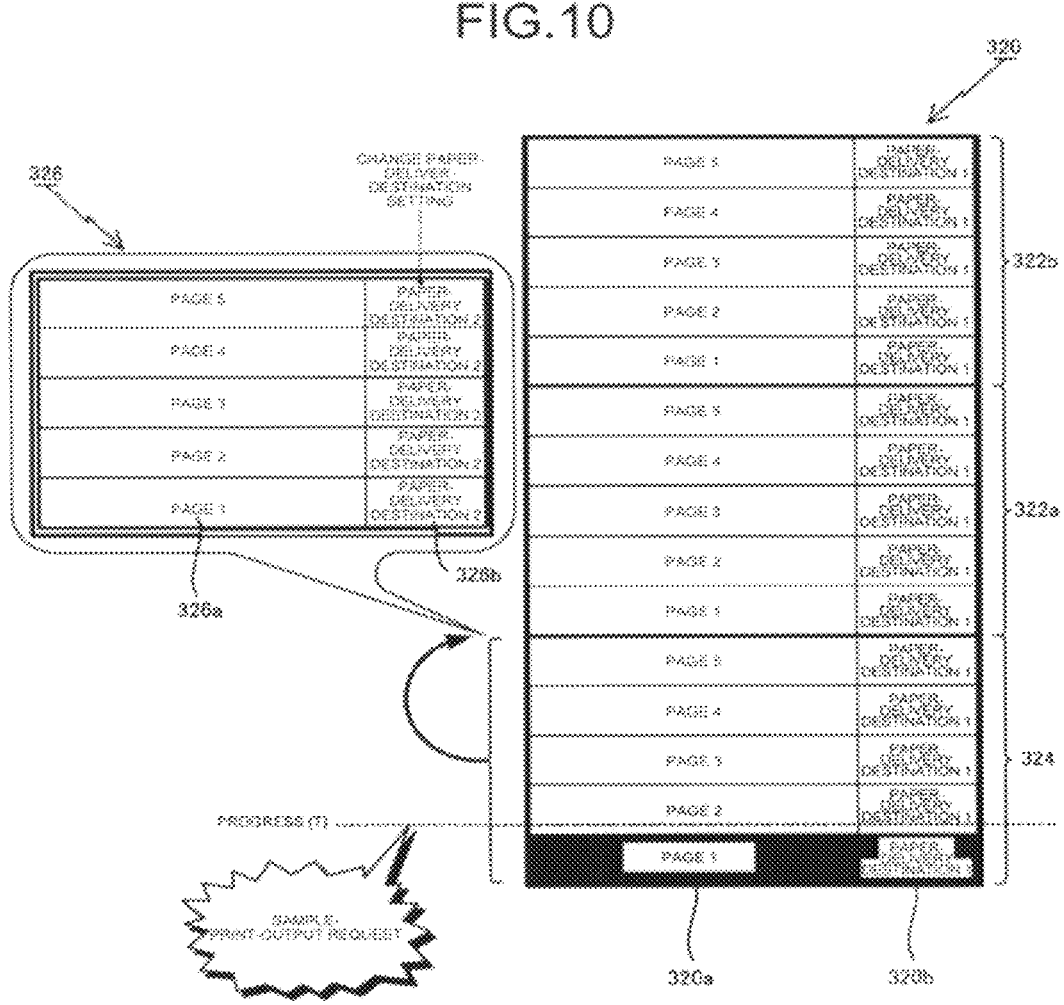

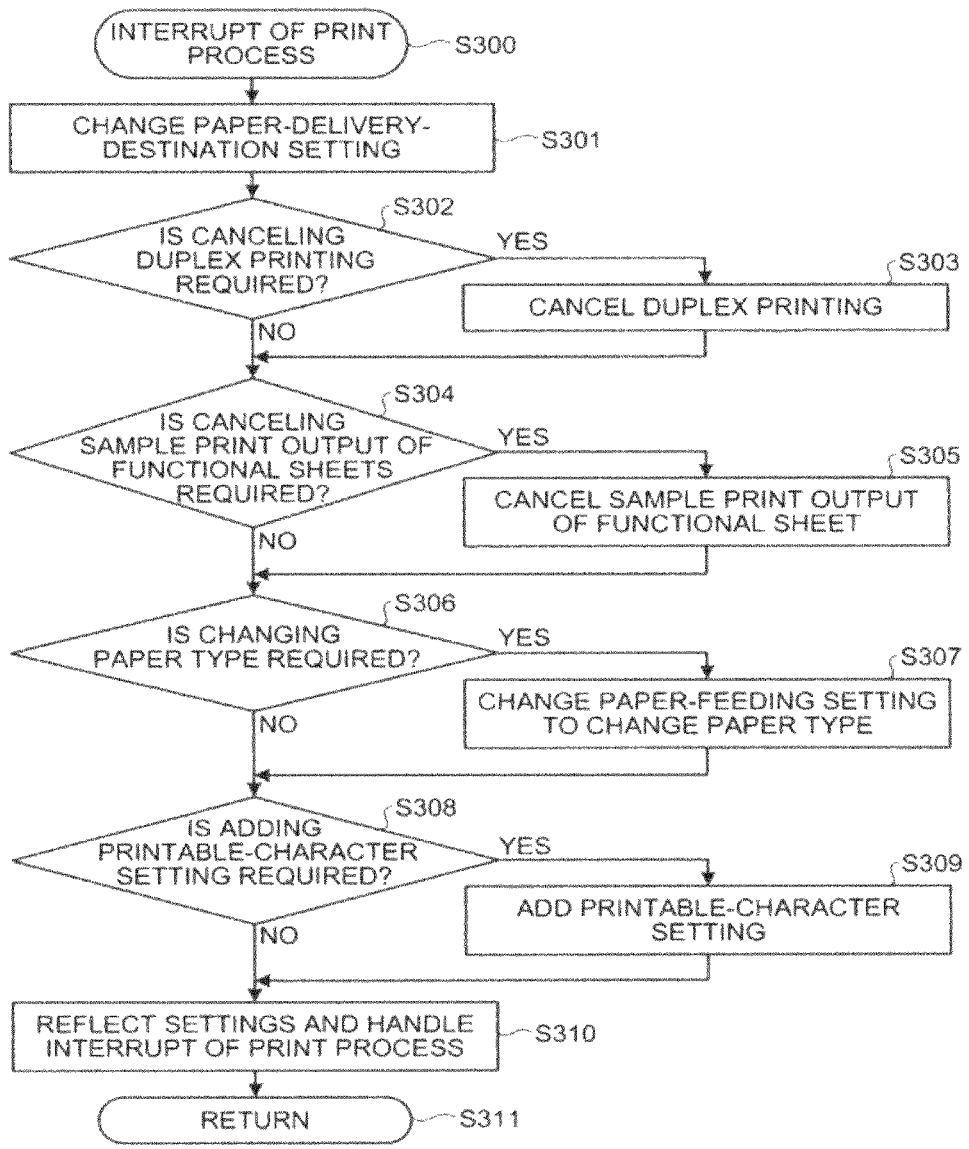

IMAGE FORMING APPARATUS, IMAGE FORMING SYSTEM, METHOD OF PRINTING SAMPLE PRINT, AND COMPUTER PROGRAM PRODUCT

CROSS-REFERENCE TO RELATED APPLICATIONS

The present application claims priority to and incorporates by reference the entire contents of Japanese priority document 2007-069949 filed in Japan on Mar. 19, 2007.

BACKGROUND OF THE INVENTION

1. Field of the Invention

The present invention relates to technology for printing a sample print.

2. Description of the Related Art

In recent years, there are increasing tendencies to value the quality of finished products. In particular, in bulk printing, it is required to check whether a desired finishing can be obtained with the current print settings, and changes of the quality of printed matter with time are also required to be observed. In general, the final finishing of printed matter depends on a printer adjustment state and the type of the paper used. In other words, it is difficult to accurately predict the final finishing of the printing by using a computer. Moreover, an image forming apparatus, such as a printer or copier, causes more color shifts or changes in density of a printed image, as the number of times of print processing is increased, due to degradation of a photosensitive member, a paper-feeding roller, a conveying roller, and the like.

The quality of the finished printed matter can be checked by performing trial printing. In trial printing, a batch of sheets is output in a unit of one copy as sample printing so as to check a finishing state with the print settings specified by the user. Conventionally, the trial printing is performed before performing actual printing. In other words, the trial print is visually checked to decide whether to really perform the actual printing. An attempt has been made such that a process of forming a copy image currently being executed is suspended and trial copy printing of the next document image is performed, so that trial copy printing can be performed even at extended reservation copying that allows the next document image to be read during a copying operation.

Furthermore, Japanese Patent Application Laid-open Publication No. 2005-234328 discloses a system that includes a surface image-pickup unit provided to a stock device for image pickup of a copy subject output from a copier and a displaying unit that displays the copy subject image-picked-up by the surface image-pickup unit, for the purpose of visually checking an image formation state of the copied subject and a stock state.

In addition, regarding checks on the finishing of the printed matter, a technology is also known in which, at the time of print output using an editing function, such as duplex printing or combination printing, a predicted finishing state can be checked on a display screen so as to save an unnecessary print output due to a setting error.

Conventionally, when changes of the quality of the finished printed matter with time are checked, the printing operation is temporarily suspended, and the printed matter is visually checked to see the finishing state. However, with the printing operation being suspended, productivity is disadvantageously decreased. Moreover, when the printed matter after print output is conveyed to a post-processing device, such as a stacker, a paper-delivery state in the stacker cannot be easily viewed, and therefore it is disadvantageously impossible to check the finishing state.

Furthermore, the trial printing function is to determine, as explained above, whether a desired finishing can be obtained with the print settings specified by the user, such as the number of combination, scaling factor, image density, and specification of duplex printing. Trial printing is targeted for a unit of batch of sheets and, to check changes with time, the printing operation being executed has to be suspended. Therefore, this suspension of the printing operation directly leads to a decrease in productivity in the conventional trial printing, in particular in bulk printing, thereby causing significant damages. Still further, there are also needs in which, for the purpose of checking only the quality, such as image density, of the printed image, a sample print output of the entire single copy is not necessarily required, and it is enough to check only the printed image on an arbitrary page or pages in the copy.

In the conventional technology disclosed in Japanese Patent Application Laid-open Publication No. 2005-234328, to check the finishing, the image pickup unit, such as a charge coupled device (CCD) camera, and a displaying unit, such as a liquid-crystal display device, must be provided. This increases the costs. Moreover, although visual checks through a picked-up image are allowed, an actual printed image cannot be checked, thereby making it impossible to check the finishing quality with a sufficient accuracy.

SUMMARY OF THE INVENTION

It is an object of the present invention to at least partially solve the problems in the conventional technology.

According to an aspect of the present invention, there is provided an image forming apparatus that selects a paper-delivery destination and performs a print output. The image forming apparatus includes a print-process managing unit that divides a print job into print processes and controls a print output; and a sample-print-output controlling unit that controls execution of a sample print output by causing, in response to a sample-print-output request, an interrupt of a duplicate of a predetermined print process of a print job, with the paper-delivery destination being changed, to be handled by the print-process managing unit.

According to another aspect of the present invention, there is provided a method of printing a sample print on an image forming apparatus in which it is possible to selects a paper-delivery destination. The method includes dividing a print job into print processes and controlling a print output; and controlling execution of a sample print output by causing, in response to a sample-print-output request, an interrupt of a duplicate of a predetermined print process of a print job, with the paper-delivery destination being changed, to be handled at the dividing.

According to still another aspect of the present invention, there is provided a computer program product comprising a computer usable medium having computer readable program codes embodied in the medium that, when executed, causes a computer to execute the above method.

According to still another aspect of the present invention, there is provided an image forming apparatus that selects a paper-delivery destination and performs a print output. The image forming apparatus includes print-process managing means for dividing a print job into print processes and controlling a print output; and sample-print-output controlling means for controlling execution of a sample print output by causing, in response to a sample-print-output request, an interrupt of a duplicate of a predetermined print process of a print job, with the paper-delivery destination being changed, to be handled by the print-process managing means.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a flowchart of a process flow, according to another embodiment, of a sample print output performed by the MFP;

FIG. 10 is a drawing of a print job according to another embodiment performed by the MFP;

FIG. 13 is a flowchart of details of a process routine for handling an interrupt of a print process for sample print output;

DETAILED DESCRIPTION OF THE PREFERRED EMBODIMENTS

Exemplary embodiments of the present invention are explained below, which are not meant to be restrictive.

Here, in the embodiments explained below, as one example of an image forming apparatus, a multifunctional peripheral (MFP) with a plurality of functions for handling images is used, such as copier, facsimile, scanner, and printer functions.

Figure 1:
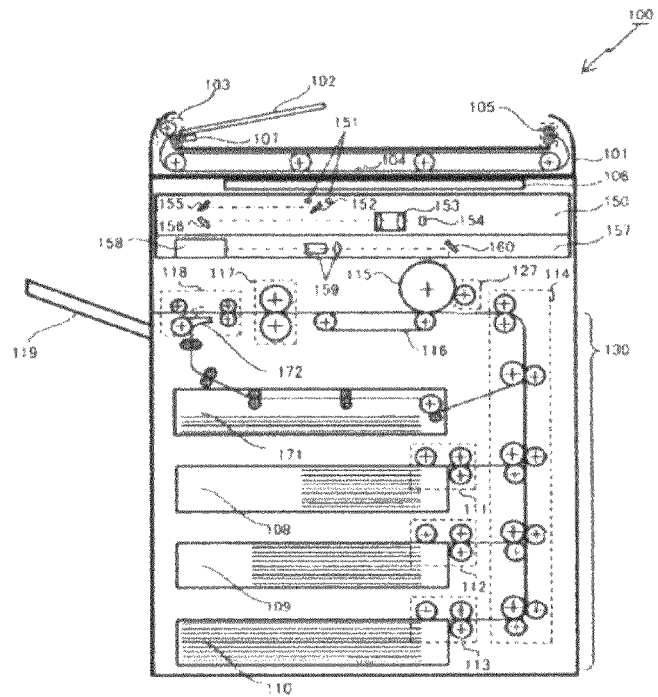
FIG. 1 is a drawing of a multi functional peripheral (MFP)

FIG. 1 depicts a MFP 100 according to an embodiment of the present invention. The MFP 100 includes an automatic document feeder (ADF) 101, a contact glass 106, an image reading unit 150, an image forming unit 157, and a transfer and fixing unit 130. The ADF 101 includes a document mount 102, paper-feeding rollers 103, a paper-feeding belt 104, paper-delivery rollers 105, and a document-set detection sensor 107. The paper-feeding rollers 103, the paper-feeding belt 104, and the paper-delivery rollers 105 are motor-driven. In the ADF 101, a batch of document sheets set on the document mount 102 is conveyed by the paper-feeding rollers 103 and the paper-feeding belt 104 from a document sheet set on top to a predetermined position on the contact glass 106. The document sheet from which an image has been read is then delivered by the paper-feeding belt 104 and the paper-delivery rollers 105. In the ADF 101, it is detected by the document-set detection sensor 107 that any set document sheet has been left, and the document sheets are fed and delivered until image reading from all document sheets is completed.

The image reading unit 150 includes a light-exposure lamp 151, a first mirror 152, a second mirror 155, a third mirror 156, a lens optical system 153, and a charge coupled device (CCD) image sensor 154. In the image reading unit 150, light is emitted from the light-exposure lamp 151, and the light reflected from the document on the contact glass 106 is reflected by the first mirror 152, the second mirror 155, and the third mirror 156 to be guided via the lens optical system 153 to the CCD image sensor 154 for image reading.

The image forming unit 157 includes a laser output unit 158, an image-forming-lens optical system 159, a mirror 160, and a photosensitive drum 115. In the image forming unit 157, a light beam is emitted from the laser output unit 158, and the emitted light beam is applied to the photosensitive drum 115 via the image-forming-lens optical system 159 and the mirror 160 for image light exposure of the photosensitive drum 115, thereby forming an electrostatic latent image.

The formed electrostatic latent image is conveyed to a developing unit 127 as the photosensitive drum 115 rotates. The electrostatic latent image is developed with a developer, and a developer image is formed and supported on the photosensitive drum 115. The developer image is then conveyed to the transfer and fixing unit 130 as the photosensitive drum 115 rotates. The transfer and fixing unit 130 includes paper-feeding cassettes 108, 109, and 110, paper-feeding units 111, 112, and 113, a vertical conveying unit 114, a conveyer belt 116, and a fixing unit 117. Transfer members, such as high-quality paper sheets or plastic sheets, stacked on the paper-feeding cassettes 108 to 110 are fed by the paper-feeding units 111, 112, and 113, respectively, and are conveyed by the vertical conveying unit 114 to a position where they abut on the photosensitive drum 115.

The developer image on the photosensitive drum 115 is transferred onto a transfer member electrostatically attached to the conveyor belt 116 under a transfer bias potential and, after transfer, an image is formed on the transfer member. The formed image is fixed by the fixing unit 117. The printed matter after fixing is delivered by a paper delivering unit 118 onto a paper-delivery tray 119. Also, in the case of duplex printing, by setting a separation nail 172 at an upper side, the printed matter is not guided onto the paper-delivery tray 119 but is temporarily stocked in a paper-feeding unit for duplex printing 171. Then, the printed matter stocked in the paper-feeding unit for duplex printing 171 is fed again for image transfer on a rear side. The duplex printed matter with images fixed on both sides is delivered onto the paper-delivery tray 119 by setting the separation nail 172 at a lower side.

Here, in the present embodiment, the configuration is explained such that the printed matter is delivered by the paper delivering unit 118 onto to the paper-delivery tray 119. However, in an embodiment in which the MFP 100 and another device, such as a finisher device, are connected together, the printed matter will be conveyed to a paper-delivery destination according to the configuration of the connected device. Also in the present embodiment, the photosensitive drum 115 has been explained as having a single configuration. Alternatively, by adopting photosensitive drums for cyan, magenta, and yellow, and their corresponding image forming units 157, a configuration capable of full-color print output can be achieved.

The MFP 100 further has implemented therein a parallel interface (I/F), such as the Institute of Electrical and Electronics Engineers (IEEE) 1294 or a universal serial bus (USB), a serial bus interface (I/F), or a network interface (I/F) for connection to Ethernet®.

For example, the MFP 100 can interpret a print control instruction written in, for example, Printer Job Language (PJL), from a host computer to perform an image forming process. In the following, a general outline of an image forming system including the MFP 100 is explained.

Figure 2:
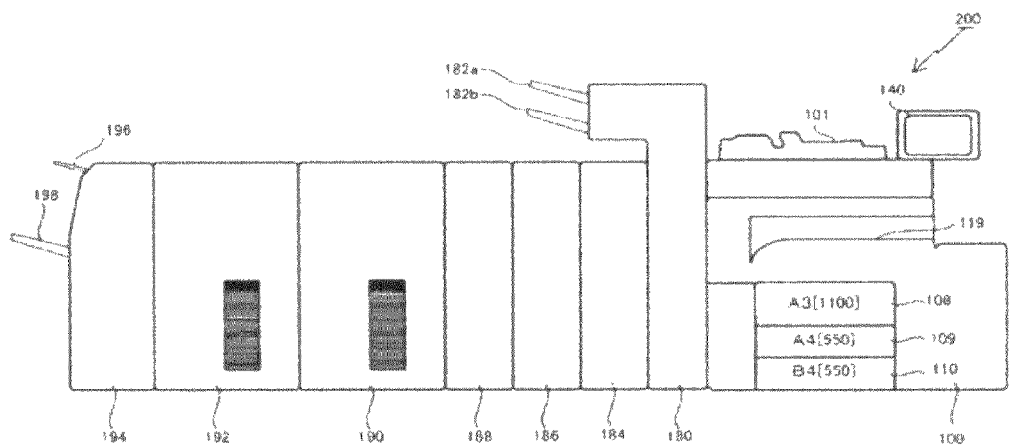
FIG. 2 is a drawing of the configuration of an image forming system according to an embodiment configured as including the MFP.

FIG. 2 is s schematic of an image forming system 200 according to another embodiment of the present invention.

The image forming system 200 includes the MFP 100, a two-stage inserter 180 connected adjacently to the MFP 100, a Z-folding device 184 connected to the two-stage inserter 184, a stapling unit 186 further connected to the Z-folding device 184, and a punching unit 188 further connected to the stapling unit 186. The two-stage inserter 180 includes trays 182a and 182b for setting a chapter-break sheet for insertion. As required, a chapter-break sheet or the like is inserted between print-output transfer members (hereinafter exemplarily explained as paper sheets). The Z-folding device 184 folds, as required, a print-output paper sheet in a Z shape. The stapling unit 186 staples, as required, a batch of aligned paper sheets including the print-output paper sheets from the MFP 100 and chapter-break sheets inserted by the two-stage inserter 180. The punching unit 188 punches, as required, the paper sheets conveyed one by one.

The image forming system 200 further includes paper-deliver stackers 190 and 192 and a finisher 194. The paper-delivery stackers 190 and 192 each have the print-output paper sheets stacked on its tray, and can be specified as a paper-delivery destination from the MFP 100. The finisher 194 includes a movable paper-delivery tray 196 and a staple tray 198, and they can be each specified as a paper-delivery destination from the MFP 100. The MFP 100 includes the ADF 101, the paper-feeding cassettes 108 to 110, the display device 140, and the paper-delivery tray 119 as a paper-delivery destination of its own. The two-stage inserter 180, the Z-folding device 184, the stapling unit 186, the punching unit 188, the paper-delivery stackers 190 and 192, the finisher 194, and the like are each connected to the MFP 100 through serial connection, for example, and their operations are controlled by the MFP 100 to perform an image forming operation and a post-process operation in an interlocking manner.

Also, the image forming system 200 is configured so that the paper-delivery tray 119, the paper-delivery stackers 190 and 192, and the movable paper-delivery tray 196 and the staple tray 198 of the finisher 194 can be specified as a paper-delivery destination for the print-output paper sheet from the MFP 100.

Figure 3:
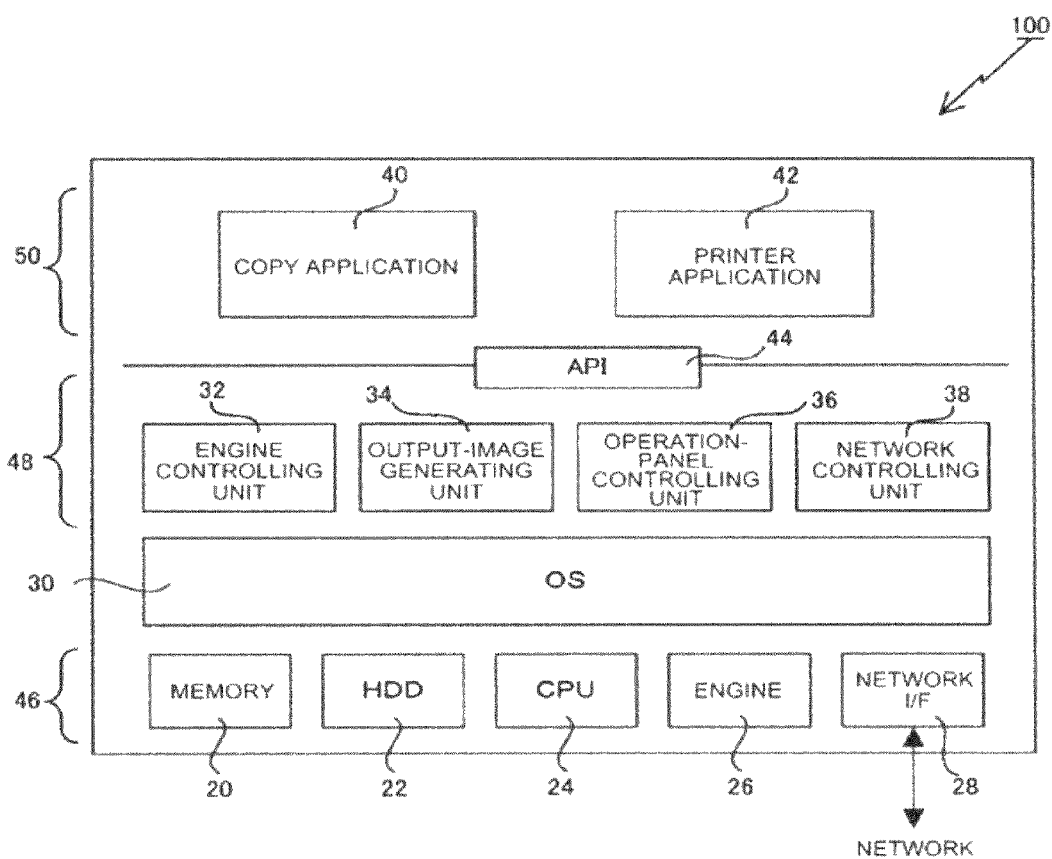
FIG. 3 is a schematic drawing of software and hardware configurations of the MFP according to the present embodiment.

FIG. 3 is a block diagram of software and hardware configurations of the MFP 100. The MFP 100 includes an application module layer 50 formed of various applications for providing a plurality of functions, a service module layer 48 thereunder, and a hardware resource layer 46 including various hardware resources.

The application module layer 50 includes a software group for performing a process unique to a user service for print processing, such as printing and copying. In the embodiment depicted in FIG. 3, the application module layer 50 includes a copy application 40 that provides a copy function and a printer application 42 that provides a printer function.

The service module layer 48 is interposed between hardware resources, such as a central processing unit (CPU) 24 and an engine 26, and the application module layer 50, and includes functioning units 32 to 38, which forms an software group that interprets, together with an operating system (OS) 30, process requests from various applications and issue an acquisition request for various resources, such as hardware components. As the OS, for example, UNIX® can be adopted. Alternatively, MacOS®, Windows®, LINUX®) VxWorks®, or any other appropriate OS can be adopted. In the embodiment of FIG. 1, the service module layer 48 includes, as various functioning units, an engine controlling unit 32, an output-image generating unit 34, an operation-panel controlling unit 36, and a network controlling unit 38.

The output-image generating unit 34 processes (combines, reduces, enlarges, or rotates, for example) image data stored in a hard disk drive (HDD) 22, image data read by the engine 26, or image data received from an external device over a network, according to an instruction from an upper-level application. The operation-panel controlling unit 36 controls a user interface, such as an operation panel serving as an interface between an operator and main-body control, and receives various process requests from the user interface.

The network controlling unit 38 controls a network interface (I/F) 28, such as Ethernet®, providing commonly-usable services to each application. The network controlling unit 38 distributes data received under each communication protocol from a network side to the applications, serves as an intermediary when data from each application is transmitted to the network side, and process print jobs, various settings, and management requests via the network.

The engine controlling unit 32 controls the hardware resources, such as the engine 26 including a scanner engine and a plotter engine and the HDD 22 to control an image reading operation and a print operation. Also, the engine controlling unit 32 according to the present embodiment divides a job received from an upper-level application into print processes in units of one document sheet or transfer sheet level so that the job can be handled by the engine 26, and manages these print processes. In sample print output, which will be explained further below, when a sample-print-output request is received via the user interface, such as an operation panel, a notification as such is provided to the engine controlling unit 32. The engine controlling unit 32 receiving such a notification issues to the engine 26 a print output request, with print settings of the job being executed, for a predetermined print process for which a print output request is scheduled to be issued to the engine 26 next, and also issues to the engine 26 a print output request with a paper-delivery-destination setting being changed, thereby achieving a sample print output.

Furthermore, between the application module layer 50 and the service module layer 48, an application program interface (API) 44 is provided. Using functions defined in advance included in the API 44, each functional unit in the service module layer 48 receives a process request from each application in the application module layer 50.

The hardware resource layer 46 of the MFP 100 includes the CPU 24 for various arithmetic operations, a Read-Only Memory (ROM) not shown for storing various control programs, and a memory 20 that provides a working memory area of the CPU 24. The software configuration and various processing units for performing a sample print output, which will be explained further below, are achieved by loading a program (not shown) stored in a storage device, such as the ROM, the HDD 22, or a Secure Digital (SD) card, into the memory area of the memory 20. Also, the system state of the MFP 100 and setting information for sample print output, which will be explained further below, are stored in a Non-Volatile Random Access memory (NV-RAM) not shown.

Here, specific examples of the CPU for use by the MFP 100 include: PENTIUM® to PENTIUM® IV; a CPU based on a Complex-Instruction-Set-Computer (CSIC) architecture exemplified by a PENTIUM®-compatible CPU, such as Celeron®; POWER PC® or a CPU based on a Reduced-Instruction-Set-Computer (RISC) architecture, for example, a Microprocessor without Interlocked Pipe Stage (MIPS).

Also, various applications included in the application module layer 50 can be configured through various combinations, and are not particularly restrictive. In another embodiment, for example, a facsimile application that provides a facsimile function, a scanner application that provides a scanner function, and a network file application that provides a network file function can be included. Furthermore, the configuration of each functional unit included in the service module layer 48 is not particularly restrictive, and can be, for example, according to the specifications of the application module layer 50.

Figure 4:
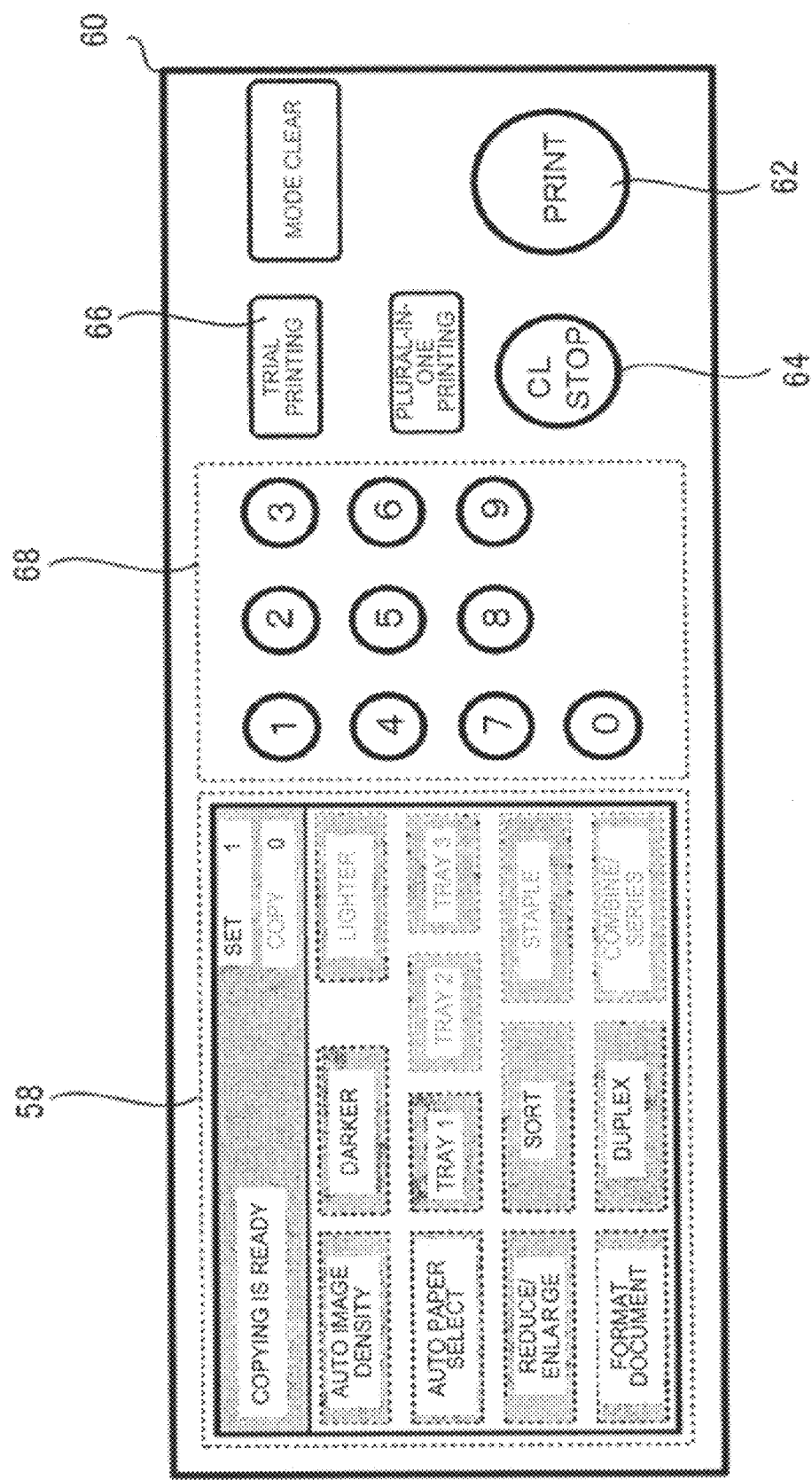
FIG. 4 is a drawing of a general outline of an operation panel included in the MFP according to the embodiment.

FIG. 4 is a schematic of an operation panel 60 of the MFP 100. The operation panel 60 has a "PRINT" button 62 for receiving a print start instruction, a "CL/STOP" button 64 for stopping a print operation and clear an entry, a "trial printing" button 66 for receiving an instruction for starting a sample print output, a numerical keypad 68 for entering numbers, and a touch panel 58 integrally formed of a display device and an input device.

The operator presses a graphical user interface (GUI) displayed on the touch panel 58 to make print settings in advance, such as specifying duplex printing, combination printing, divided printing, a paper-feeding cassette selection, density adjustment, and the like. Then, the operator presses the "PRINT" button 62 to provide a job start instruction to the MFP 100. Also, the operator presses the "trial printing" button 66 during job execution to provide a sample-print-output start instruction to the MFP 100. Here, the operation onto the operation panel 60 is managed by the operation-panel controlling unit 36, and each functional unit in the service module layer 48 including the engine controlling unit 32 is notified of that operation. Here, a sample-print-output function is explained in detail below.

Figure 5:
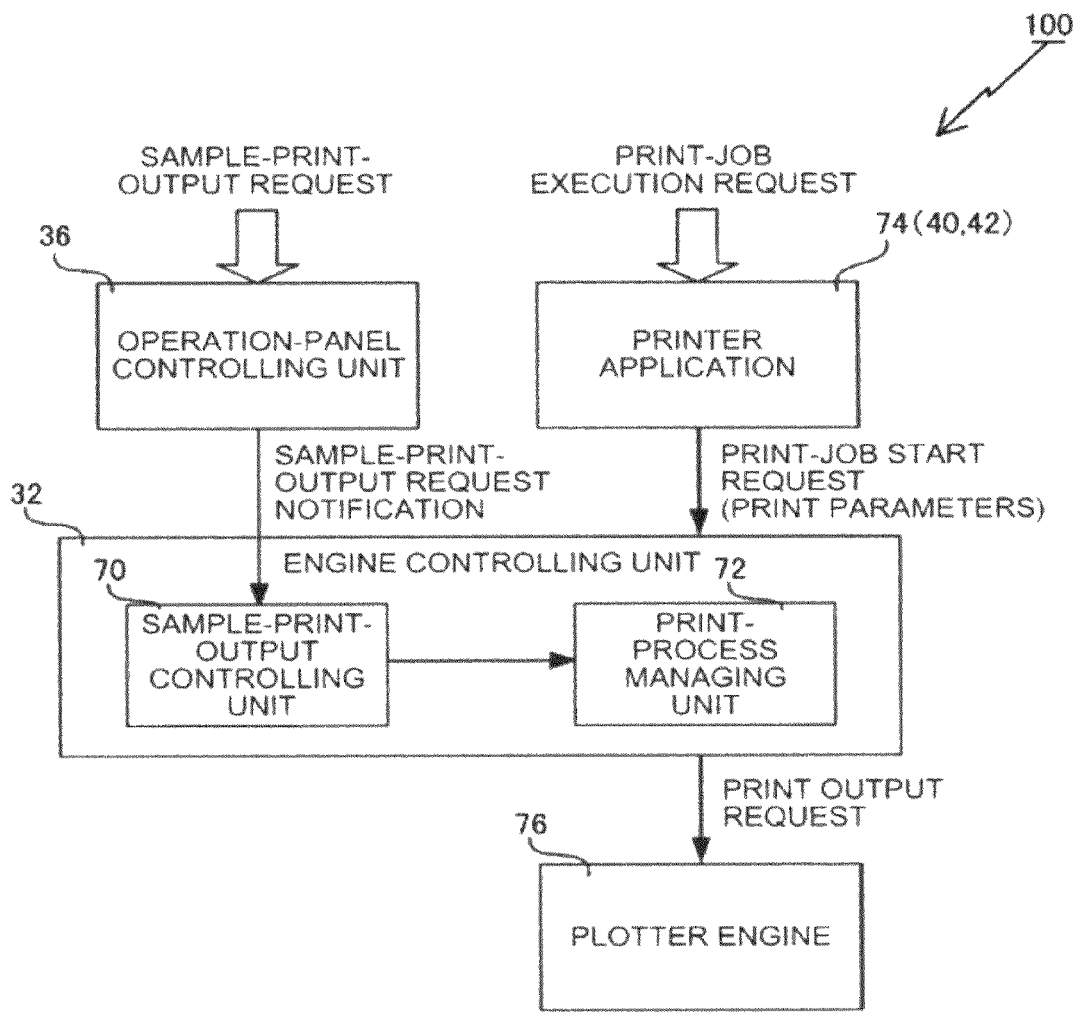
FIG. 5 is a block diagram of a main configuration of a sample-print-output function included in the MFP according to the present embodiment.

FIG. 5 is a block diagram of a main configuration of the sample-print-output function included in the MFP 100. The MFP 100 includes a plotter engine 76, the engine controlling unit 32, the operation-panel controlling unit 36, and an application 74. The application 74 corresponds to each application in the application module layer 50 depicted in FIG. 3, and is taken as the copy application 40 or the printer application 42 that includes a print output process. The application 74 receives a job execution request from the operator via, for example, the operation panel 60, the parallel or serial I/F, such as IEEE 1294 or USB, or the network I/F 28 to start a job including a print output process (hereinafter, referred to as "print job"), and issues a print-job start request to the engine controlling unit 32. Here, the print-job start request is attached with various print parameters associated with print output, including: a paper-delivery-destination setting; an edit setting, such as a specification of duplex printing or a specification of combination printing; a post-process setting; a paper-sheet setting; a printable-character setting; a repeat-copy-count setting; and a print density setting.

The engine controlling unit 32 includes a print-process managing unit 72 and a sample-print-output controlling unit 70. When the engine controlling unit 32 receives a print-job start request, the print-process managing unit 72 manages and divides a print job into print processes in units of one transfer sheet, according to print parameters attached to the print-job start request. Also, the print-process managing unit 72 manages a schedule of the print processes of the print job in units of one transfer sheet and in units of one copy, and also manages a sheet-batch unit such as staple process. Furthermore, when a specification of duplex printing is included, the print-process managing unit 72 associates a front surface and a rear surface together and also manages a printing order, thereby achieving correct duplex printing. Under the management of the print-process managing unit 72, the engine controlling unit 32 sequentially issues to the plotter engine 76 a print output request for a print process in a unit of one transfer sheet, according to the progress of the print job. The plotter engine 76 receiving the print output request performs the requested print operation for a print process for a unit of one transfer sheet to perform a print output in units of one sheet.

In the following, the function of the engine controlling unit 32 is explained by taking a copy job by the copy application 40 and a print job by the printer application 42 as examples. When a copy-job execution instruction is received from the operator, document feeding by the ADF 101 is started, and a document image reading process is performed by a scanner engine not shown under the control of the engine controlling unit 32, thereby causing read image data in units of one document sheet of a page number m to be temporarily stored in the HDD 22, for example. The engine controlling unit 32 issues, to the plotter engine 76, print requests for the page number m per copy by a number of repeat copies n by using electronic sorting function, thereby causing print outputs for the predetermined number of copies. Similarly, in the case of a print job by the printer application 42, based on a print control instruction received from a host computer, print image data in units of one transfer sheet is generated, the engine controlling unit 32 issues, to the plotter engine 76, a print requests for the page number m×the number of repeat copies n, thereby causing print outputs for the predetermined number of copies.

The sample-print-output controlling unit 70 of the engine controlling unit 32 receives, for example, a notification of a sample print output request from the operation-panel controlling unit 36 that has detected a press of the "trial printing" button 66, and causes an interrupt of a predetermined print process for sample print output to be handled by the print-process managing unit 72. This predetermined print process is, for example, a print process obtained by duplicating a print process for which a print output request is scheduled to be issued next to the plotter engine 76, with a paper-delivery-destination setting being changed. As a result, the engine controlling unit 32 issues, to the plotter engine 76, a print output request for the scheduled print process, with the print settings as specified at the time of starting the print job, and also issues, to the engine 26, a print output request with the paper-delivery-destination setting of the print settings being changed, thereby achieving a sample print output to a different paper-delivery destination.

The predetermined print process that supports the sample print output can be a print process in a unit of one transfer sheet or a print process in a unit of one copy formed of a plurality of print process in a unit of one transfer sheet. Hereinafter, a unit of a print process that supports the sample print output is referred to as a unit of sample print output. The unit of sample print output is copy-based when the print job includes a setting, such as a specification of a stapling process, in which a process is performed in units of copies. In that case, a sample print output is performed including a post process, and the finishing after the post process can also be checked. Furthermore, the unit of sample print output can be transfer-sheet-based even when the print job includes a setting in units of copies, such as a specification of a stapling process. In that case, an arbitrary page in the batch of sheets of one copy is extracted, a sample print output is performed with the specification of a stapling process being cancelled, and only the image of one sheet of the printed matter can be checked.

Whether the unit of sample print output is a unit of one copy or a unit of one transfer sheet is selected as appropriate according to the print settings included in the print job and the purposes. When an instruction for a sample print output is made, settings entered through the operation panel 60 can be used, or settings stored in advance in the NV-RAM or others as setting information for sample print output can be referred to. Hereinafter, a process flow of the sample-print-output function is explained.

Figure 6:
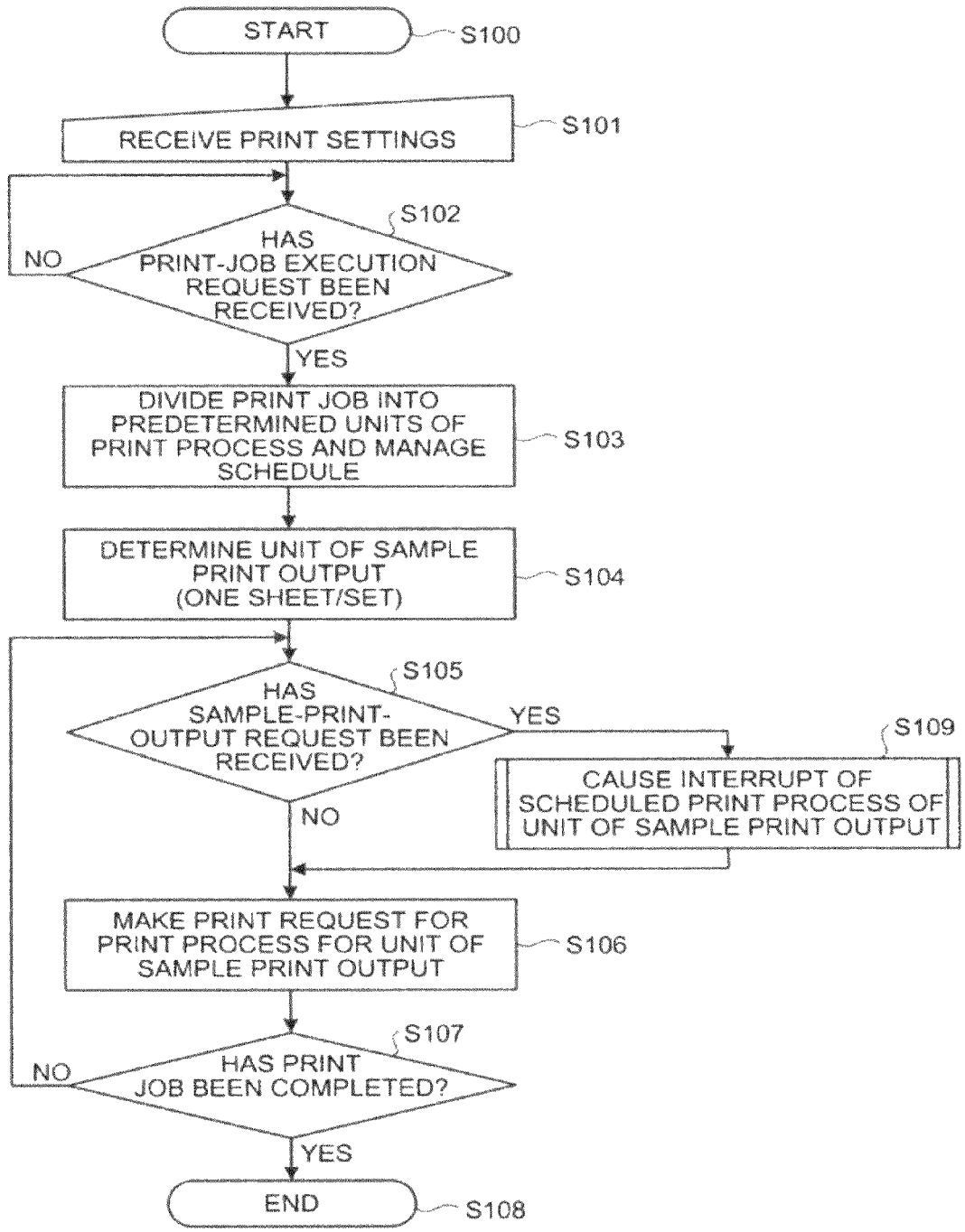
FIG. 6 is a flowchart of a process flow of a sample print output performed by the MFP according to the present embodiment.

FIG. 6 is a flowchart of a process flow of a sample print output performed by the MFP 100. The control depicted in FIG. 6 starts with step S100. At step S101, print settings from the operator are received, and preparations for starting the print job are made. At step S102, it is determined whether a print-job execution request issued by the operator pressing, for example, the "PRINT" button 62, has been received. If it is determined that a print-job execution request has not yet been received ("NO") at step S102, the procedure is branched again to step S102, thereby repeating the loop until a print-job execution request is received.

If it is determined that a print-job execution request has been received ("YES") at step S102, the procedure is branched to step S103. At step S103, a print-job start request is issued from the application 74 to the engine controlling unit 32. The print-process managing unit 72 then divides the print job into print processes in units of one transfer sheet according to the print parameters included in the print-job start request, and manages a schedule of the print processes in units of one transfer sheet or in units of one copy. Here, it is assumed in the present embodiment that the print parameters included in the print-job start request include print settings of a specification of a paper-delivery destination and a specification of a stapling process but do not include other print settings, such as a specification of duplex printing or a specification of combination printing.

At step S104, a unit of sample print output is determined by referring to the setting information for sample print output set in advance. Here, in FIG. 6, an example is explained below in which a unit of one transfer sheet is determined as the unit of sample print output. At step S105, the sample-print-output controlling unit 70 determines whether a notification of the sample-print-output request has been received. If it is determined that a notification of the sample-print-output request has not been received ("NO") at step S105, the procedure is branched to step S106. At step S106, the engine controlling unit 32 issues to the plotter engine 76 a print request for a print process in a unit of one transfer sheet determined at step S104. The plotter engine 76 receiving the print request performs a print operation, and the output paper sheet is then conveyed to the paper-delivery destination set at step S101. At step S107, it is determined whether the print job has been completed with the print request at step S106, that is, the print requests for all print processes in the print job have been completed. If the print job has been completed ("YES" at step S107), the procedure is branched to step S108 to end.

On the other hand, if it is determined that the print job has not been completed ("NO") at step S107, the procedure is again branched to step S105. A determination at step S105 is made every time a process request for a print process in the unit of sample print output is issued at step S106. That is, when the unit of sample print output is a unit of one copy, it is determined whether a sample-print-output request has been received every time a print operation in the unit of one copy is completed, and when the unit of sample print output is a unit of one transfer sheet, it is determined whether a sample-print-output request has been received every time a print operation in the unit of one transfer sheet is completed. Also, when a specification of a post process in a unit of one copy, such as a stapling process, is included, the process cycle from step S105 to step S107 is repeated, and every time a print operation in the unit of one copy is completed, a stapling process is performed by the stapling unit 186 and the staple tray 198 of the finisher 194 at the conveyance destination.

On the other hand, if it is determined that a sample-print-output request has been received ("YES") at step S105, the procedure is branched to step S109. At step S109, the sample-print-output controlling unit 70 causes an interrupt of a duplicate of a print process in a unit of one transfer sheet scheduled next to be handled, with the paper-delivery destination setting is changed, in the schedule as a print process for sample print output. At step S106, the engine controlling unit 32 issues to the engine a print request for the process for sample print output, thereby performing a sample print output. Then, the sample print output is conveyed to the paper-delivery destination specified in advance as setting information for sample print output. After the sample print output is performed, at step S106 of the next cycle, a print process initially scheduled and delayed due to the sample print output is performed. Hereinafter, a print job according to an embodiment executed under the process flow depicted in FIG. 6 is exemplarily explained.

Figure 7:
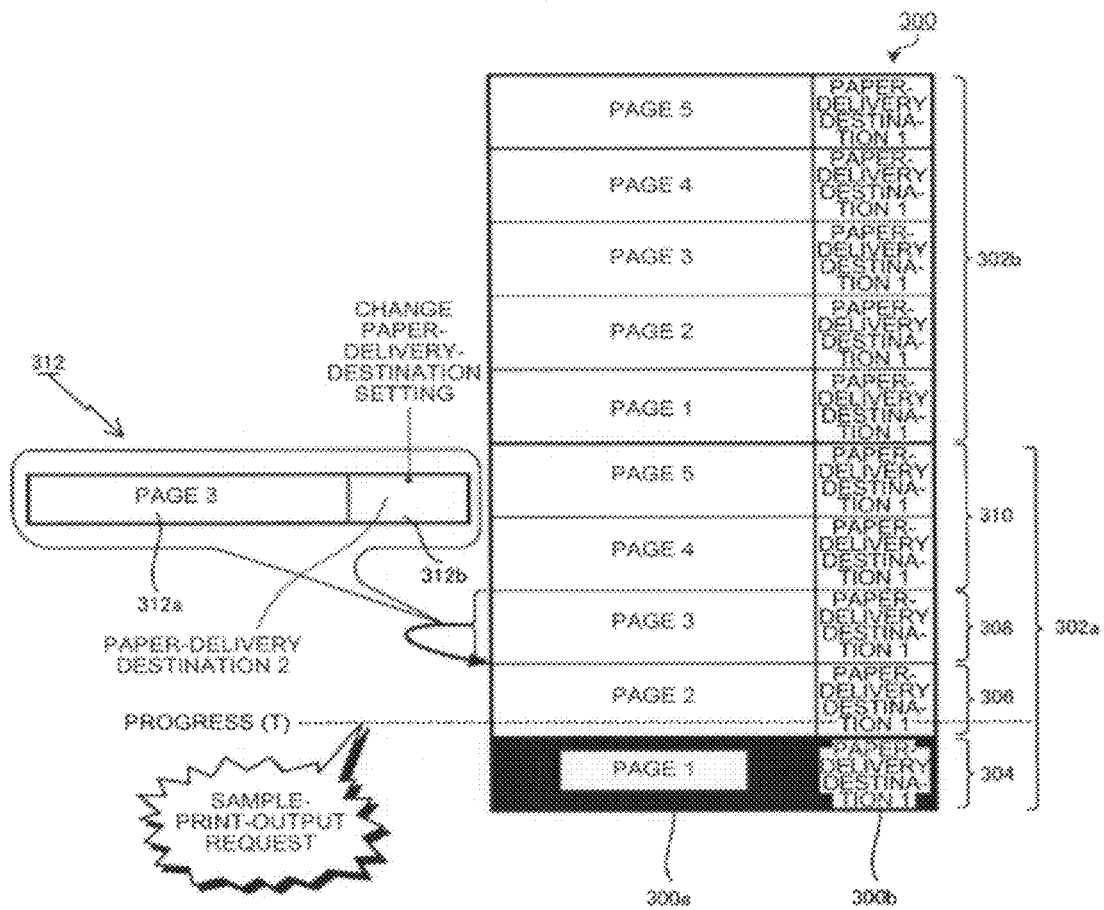
FIG. 7 is a drawing of a print job according to an embodiment performed by the MFP.

FIG. 7 is a drawing of a print job according to an embodiment performed by the MFP 100. A print job 300 depicted in FIG. 7 includes a field 300*a* schematically indicating page numbers and a field 300*b* in which specifications of paper-delivery destinations have been entered. As depicted in FIG. 7, the print job 300 corresponds to a case where images of five pages with two repeat copies are printed. The print job 300 includes print processes 302*a* and 302*b* in units of one copy. Each print process 302 in a unit of one copy includes print processes 304, 306, 308, and 310 in units of one transfer sheet. Furthermore, the embodiment depicted in FIG. 7 corresponds to a case of a print process in a unit of one transfer sheet for sample print output. The print-process managing unit 72 divides, as depicted in FIG. 7, the print job into print processes in predetermined units, and manages execution schedule.

In FIG. 7, a progress (T) of the print job is represented by a dotted line. The print process 304 corresponding to the first page of the first copy is displayed in reverse, indicating that the print operation has been completed. In FIG. 7, an example is depicted in which a sample-print-output request is made at the progress (T) represented by the dotted line, that is, during a print operation corresponding to the print process 306 on the second page of the first copy. When the sample-print-output request is made at the progress (T), after the print operation corresponding to the on-going print process 306 is completed, an interrupt of a print process 312 corresponding to a print process 308 on the third page of the first copy scheduled next with the paper-delivery destination being changed is handled before the scheduled print process 308, thereby performing a sample print output. A field 312*b* depicted in FIG. 7 indicates that the paper-delivery destination of the interrupt print process 312 is "paper-delivery destination 2" changed from "paper-delivery destination 1".

As depicted in FIGS. 6 and 7, with the control of dividing the print job into print process in units of one transfer sheet or in units of one copy, managing their schedule, and handling an interrupt of a duplicate of a predetermined scheduled process in response to the occurrence of a sample-print-output request, a sample print output can be made to an arbitrary paper-delivery destination without suspending the print job. With this, the finishing quality of the printed matter can be checked in an arbitrary unit in the print job without decreasing a print throughput. Also, when an arbitrary paper-delivery destination "paper-delivery destination 2" is configured to be capable of performing a post process equivalent to that of a normal paper-delivery destination "paper-delivery destination 1", with a sample output in a unit of one copy, the finishing quality after the post process can also be checked.

Figure 8:
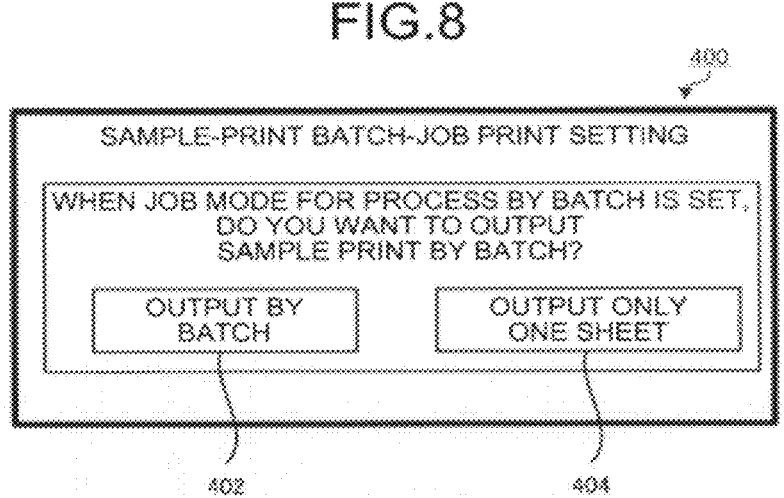
FIG. 8 is a drawing of a graphical user interface (GUI) according to an embodiment to set setting information in units of sample print output.

FIG. 8 is a drawing of a GUI according to an embodiment to set setting information for sample print output referred to at the time of determining a unit of sample print output at step S104 of the process flow depicted in FIG. 6. A GUI 1400 depicted in FIG. 8 is displayed on the touch panel 58 of the operation panel 60, and includes a display indicative of a sample print setting for sample print output on a print job in a unit of a sheet batch, an "output by batch" button 402, and an "output only one sheet" button 404.

The buttons 402 and 404 wait for an instruction from an operator's pressing and, in response to a pressing of the "output by batch" button 402 on the touch panel 58 where the GUI 400 is displayed, a setting for sample print output in a unit of one copy is stored in the NV-RAM as setting information for sample print output. Also, in response to a pressing of the "output only one sheet" button 404, also for a print job in units of one batch, a setting for sample print output in a unit of one sheet is stored in the NV-RAM as setting information for sample print output. Hereinafter, a process flow of a sample print output according to another embodiment is explained.

FIG. 9 is a flowchart of a process flow, according to another embodiment, of a sample print output performed by the MFP 100. In the process flow depicted in FIG. 6, an interrupt of a duplicate of the print process scheduled next is handled with the paper-delivery-destination setting being changed. By contrast, in the process flow depicted in FIG. 9, a control is performed such that an interrupt of a duplicate of the print process already subjected to a print operation and print output is handled with the paper-delivery-destination being changed. With this, a sample print output corresponding to a print process being executed at the time of occurrence of a sample-print-output request is made.

The control depicted in FIG. 9 starts with step S200. At step S201, print settings from the operator are received. At step S202, it is determined whether a print-job execution request has been received. If it is determined that a print-job execution request has not yet been received ("NO") at step S202, the procedure is again looped to step S202.

On the other hand, if it is determined that a print-job execution request has been received ("YES") at step S202, the procedure is branched to step S203. At step S203, a print-job start request is issued to the engine controlling unit 32. The print-process managing unit 72 then divides the print job into print processes in units of one transfer sheet according to the print parameters included in the print-job start request, and manages a schedule of the print processes in units of one transfer sheet or in units of one copy. Here, it is assumed in the present embodiment that the print parameters included in the print-job start request include print settings of a specification of a paper-delivery destination and a specification of a stapling process but do not include other print settings, such as a specification of duplex printing or a specification of combination printing.

At step S204, a unit of sample print output is determined by referring to the setting information for sample print output set in advance, by using the GUI 400, for example. Here, in FIG. 9, an example is explained below in which a unit of one copy is determined as the unit of sample print output. At step S205, the engine controlling unit 32 issues to the plotter engine 76 a print request for a print process in a unit of one copy determined at step S204. The plotter engine 76 receiving the print request performs a print operation, and the output paper sheet is then conveyed to the paper-delivery destination set at step S201.

At step S206, the sample-print-output controlling unit 70 determines whether a notification of the sample-print-output request has been received. If it is determined that a notification of the sample-print-output request has not been received ("NO") at step S206, the procedure is branched to step S207. At step S207, it is determined whether the print job has been completed with the print request at step S205, that is, whether the print requests for all print processes in the print job have been completed. If the print job has been completed ("YES" at step S207), the procedure is branched to step S208 to end. On the other hand, if it is determined that the execution of the print job has not been completed ("NO") at step S207, the procedure is again branched to step S205.

On the other hand, if it is determined that a sample-print-output request has been received ("YES") at step S206, the procedure is branched to step S209. At step S209, the sample-print-output controlling unit 70 causes an interrupt of a duplicate of a print process in a unit of one copy that has been subjected to print output in the previous cycle to be handled in the schedule as a print process for sample print output, with the paper-delivery destination being changed. At step S205, the engine controlling unit 32 issues to the plotter engine 76 a print request for the print process for sample print output, thereby performing a sample print output. Then, the sample print output is conveyed to the paper-delivery destination specified in advance as setting information for sample print output. Hereinafter, a print job according to an embodiment executed under the process flow depicted in FIG. 9 is exemplarily explained.

FIG. 10 is a drawing of a print job according to another embodiment performed by the MFP 100. A print job 320 depicted in FIG. 10 includes a field 320a schematically indicating page numbers and a field 320b in which specifications of paper-delivery destinations have been entered. As depicted in FIG. 10, the print job 320 corresponds to a case where images of five pages with three repeat copies are printed. The print job 320 includes print processes 322a, 322b, and 324 in units of one copy. Each of the print processes 322a, 322b, and 324 in a unit of one copy includes print processes in a unit of one transfer sheet for five pages. Furthermore, the embodiment depicted in FIG. 10 corresponds to a case of a print process in a unit of one copy for sample print output.

In FIG. 10, a progress (T) of the print job is represented by a dotted line. An example is depicted in which a sample-print-output request occurs during a print operation corresponding to a print process on the second page of the first copy. When the sample-print-output request is made at the progress (T), after the print operation corresponding to an on-going print process 324 in a unit of one copy is completed, an interrupt print process 326 corresponding to a completed print process 324 in a unit of one copy, with the paper-delivery-destination setting being changed, is handled before the print process 322b scheduled next, thereby performing a sample print output.

As explained above, the MFP 100 according to the present embodiment can cause, in response to the occurrence of a sample-print-output request, an interrupt of a duplicate of a predetermined print process scheduled next or a predetermined print process completed to be handled in the schedule, with the paper-delivery-destination setting being changed. The predetermined print process can be a print process in a unit of one transfer sheet or a print process in a unit of one copy, which can be arbitrarily selected. Also, the predetermined process is not meant to be restricted to those mentioned above. In another embodiment, for example, if an interrupt of a print process in a unit of one transfer sheet is handled for sample print output, it is possible to perform a control of arbitrarily extracting a print process in a unit of one transfer sheet from print processes in units of one copy being executed at the time of occurrence of the request and handling an interrupt of the extracted print process. Also, it is possible to perform a control of extracting, with a user specification, a print process in a unit of one transfer sheet from print process in units of one copy and handling an interrupt of the extracted print process. Furthermore, in view of interrupt timing, it is possible to perform a control of pending a predetermined process being executed after the predetermined process being executed is completed for interrupt.

Figure 11A:
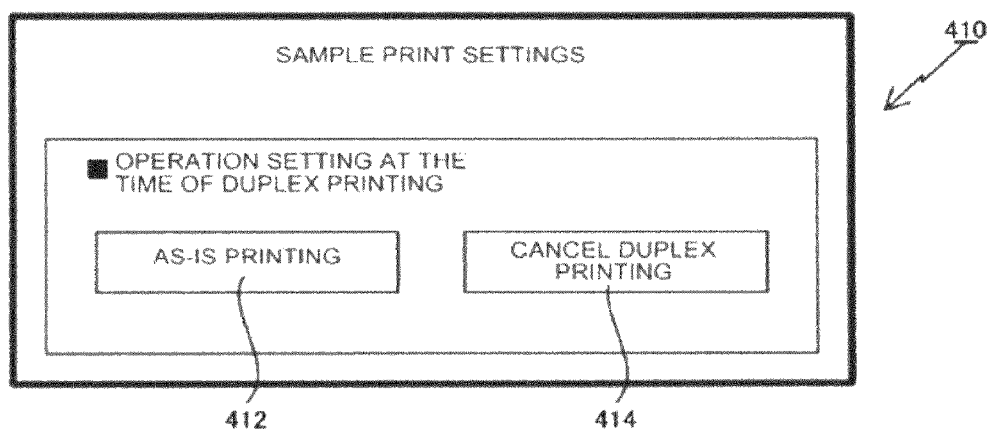
FIGS. 11A to 11C are drawings of GUIs for various settings according to an embodiment.
Figure 11B:
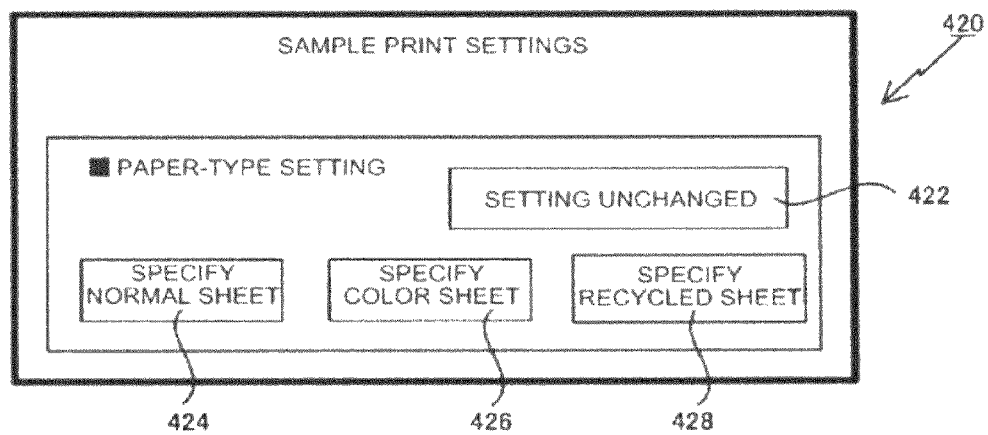
Figure 11C:
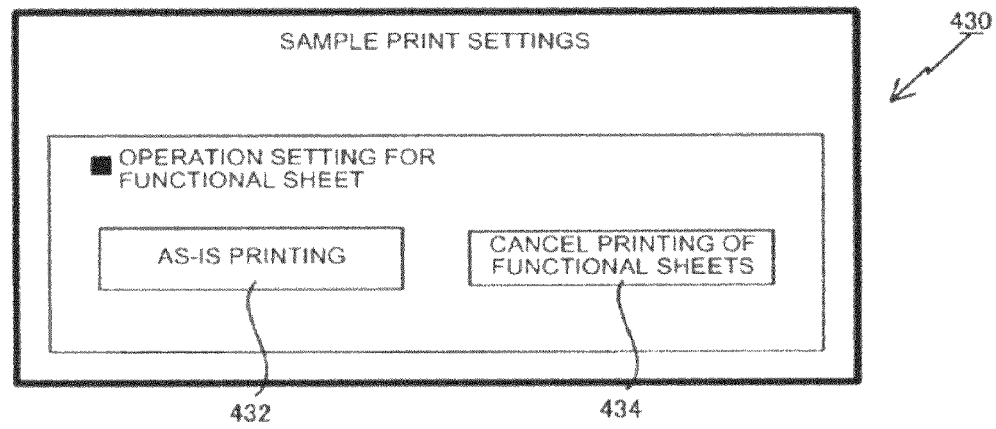

Various settings for sample print output are explained below. The MFP 100 according to the present embodiment can adds a setting change to a predetermined print process for sample print output, in addition to changing the paper-delivery-destination setting, at the time of sample print output. FIGS. 11A to 11C are drawings of GUIs for various settings according to an embodiment.

FIG. 11A depicts a GUI for setting, when the predetermined print process includes a specification of duplex printing, whether canceling the specification of duplex printing is required at the time of sample print output. A GUI 410 depicted in FIG. 11A includes a display indicative of an operation setting for sample print output at the time of a specification of duplex printing, an "as-is printing" button 412, and a "cancel duplex printing" button 414.

The buttons 412 and 414 wait for an instruction from an operator's pressing and, in response to a pressing of the "as-is printing" button 412, canceling duplex printing at the time of sample print output is set as "not required". On the other hand, in response to a pressing of the "cancel duplex printing" button 414, canceling duplex printing at the time of sample print output is set as "required". If canceling duplex printing at the time of sample print output is set as not required, even if the print process for sample print output includes a specification of duplex printing, a sample print output is made with duplex printing. On the other hand, if canceling duplex printing at the time of sample print output is set as required, if the print process for sample print output includes a specification of duplex printing, such a specification of duplex printing is cancelled for sample print output. Whether to require canceling duplex printing is stored in the NV-RAM as setting information for sample print output. Also, by using a GUI similar to that in FIG. 11A, it is also possible to set whether to require canceling a specification of combination printing or a specification of divided printing at the time of sample print output.

FIG. 11B depicts a GUI for setting whether a paper-feed setting is changed at the time of sample print output, and for setting, if changed, a specification of a paper type. A GUI 420 depicted in FIG. 11B includes a display indicative of a specification of a paper type at the time of sample print output, a "setting unchanged" button 422, a "specify normal sheet" button 424, a "specify color sheet" button 426, and a "specify recycled sheet" button 428.

The buttons 422 to 428 wait for an instruction from an operator's pressing and, in response to a pressing of the "setting unchanged" button 422, a change of the paper type at the time of sample print output is set as "not required". On the other hand, in response to a pressing of the "specify normal sheet" button 424, the "specify color sheet" button 426, or the "specify recycled sheet" button 428, a change of the paper type is set as "required" and, at the same time, a setting is made such that a normal sheet, a color sheet, or a recycled sheet is specified.

When a change of the paper type is set as not required, at the time of sample print output, a print output is made with the same paper-type setting specified by the print job. On the other hand, when a change of the paper type is set as required and the paper type is specified, a sample print output is made with the setting being changed to the specified paper type. Here, the MFP 100 retains in advance, as setting information, a correspondence between the paper-feeding cassettes 108 to 110 and the paper types of the transfer members stacked on these cassettes. When a paper type is specified for sample print output, a print output is made with an appropriate paper-feeding cassette as a paper feeder. Furthermore, by using a GUI similar to that in FIG. 11B, it is also possible to directly specify a paper-feeding tray instead of a paper type.

FIG. 11C depicts a GUI for setting whether functional sheets, such as a chapter-break sheet, a cover sheet, and a chapter-break sheet, are targets for sample print output. A GUI 430 depicted in FIG. 11C includes an "as-is printing" button 432 and a "cancel printing of functional sheets" button 434. The buttons 432 and 434 wait for an instruction from an operator's pressing and, in response to a pressing of the "as-is printing" button 432, canceling sample print output for the functional sheets is set as "not required". On the other hand, in response to a pressing of the "cancel printing of functional sheets" button 434, canceling sample print output for the functional sheets is set as "required".

When canceling sample print output for the functional sheets is set as not required, even when the print process for sample print output includes a print process with a functional-paper setting, a sample print output is made as it is. On the other hand, when canceling sample print output for the functional sheets is set as required, when the targets for sample print output is the functional sheets, the sampling print output is cancelled, when the targets for sample print output include the functional sheets, the print process with the functional-sheet setting is deleted from the targets for sample print output, and the remaining print processes are subjected to sample print output.

Figure 12A:
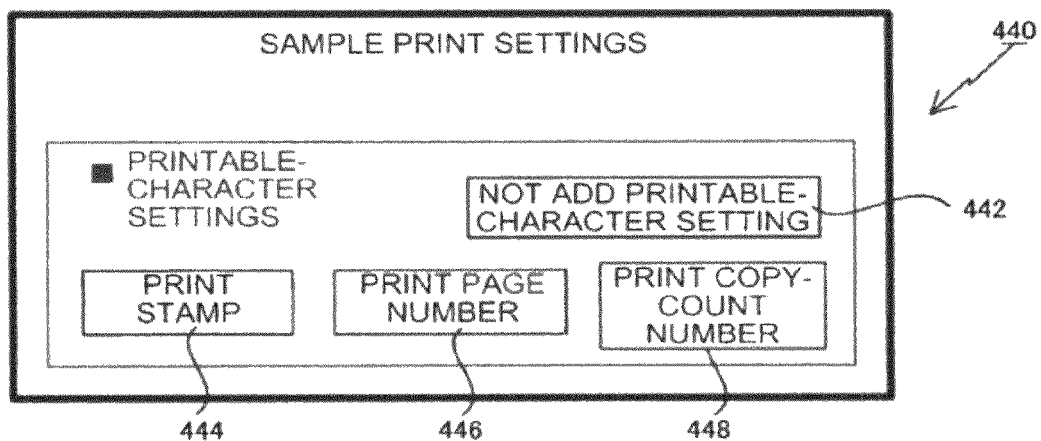
FIGS. 12A and 12B are drawings of GUIs for various settings according to another embodiment.
Figure 12B:
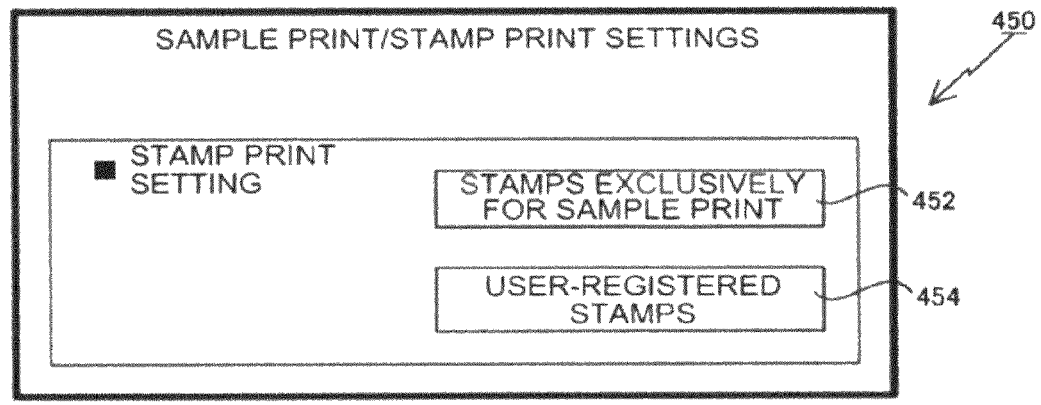

FIGS. 12A and 12B are drawings of GUIs for various settings according to another embodiment. FIG. 12A depicts a GUI for determining whether a printable-character setting is added at the time of sample print output and specifying the printable-character setting if added. A GUI 440 depicted in FIG. 12A includes a display indicative of a printable-character setting for sample print output, a "not add printable-character setting" button 442, a "print stamp" button 444, a "print page number" button 446, and a "print copy-count number" button 448.

The buttons 442 to 448 wait for an instruction from an operator's pressing and, in response to a pressing of the "not add printable-character setting" button 442, adding a printable-character setting at the time of sample print output is set as "not required". On the other hand, in response to a pressing of the "print stamp" button 444, the "print page number"

button 446, or the "print copy-count number" button 448, adding a printable-character setting at the time of sample print output is set as "required" and, at the same time, a specification of printing a stamp, a specification of printing a page number, or a specification of a copy count number is set correspondingly. When adding a printable-character setting is set as not required, a sample print output is made without adding a printable-character setting. On the other hand, when adding a printable-character setting is set as required and a specification of a printable character is set, a sample print output is made with the specified printable character(s). In the present embodiment, when the "print stamp" button 444 is pressed, a GUI for selecting a stamp depicted in FIG. 12B is further displayed.

A GUI 450 depicted in FIG. 12B includes a display indicative of a stamp print setting, a "stamps exclusively for sample print" button 452, and a "user-registered stamps" button 454. The buttons 452 and 454 wait for an instruction from an operator's pressing and, in response to a pressing of the "stamps exclusively for sample print" button 452, a list of stamp images prepared in advance is displayed, allowing a stamp image to be selected. Similarly, in response to a pressing of the "user-registered stamp" button 454, a list of user-registered stamps is displayed, allowing a user-registered stamp image to be selected. By using the GUI 450 depicted in FIG. 12B, the operator can specify a stamp for printing by using a stamp for sample print output prepared in advance or a user-registered stamp stored in a user area of the HDD 22 or the like. Various settings explained above are stored in the NV-RAM or the like as setting information for sample print output, and are referred to at the time of sample print output.

Details of a process of changing, for sample print output, print settings of a predetermined print process according to the setting information for sample print output set though the GUIs depicted in FIGS. 11A to 11C and 12A and 12B are explained below. FIG. 13 is a flowchart of details of a process routine for handling an interrupt of a print process in the unit of sample print output.

The control depicted in FIG. 13 is called by the process at step S109 of FIG. 6 or the process at step S209 of FIG. 9, starting with step S300. At step S301, the paper-delivery-destination setting of the print process for sample print output is changed. Here, as the paper-delivery destination at the time of sample print output, any destination set in advance can be used. At step S302, with reference to a setting of whether canceling duplex printing is required, if duplex printing is specified, a determination is made as to whether canceling duplex printing is required. If it is determined that canceling duplex printing is required ("YES") at step S302, the procedure is branched to step S303. At step S303, if the print process for sample print output includes a specification of duplex printing, the duplex-printing setting is cancelled, and the procedure then goes to step S304. Here, in association with canceling the specification of duplex printing, necessary adjustments are performed, such as changing the printing order and canceling execution of a print process for a rear side.

On the other hand, if it is determined that canceling the specification of duplex printing is not required ("NO") at step S302, the procedure is directly branched to step S304. At step S304, it is determined whether canceling a sample print output of functional sheets is required. If canceling printing of functional sheets is set as "required", that is, if canceling a sample print output of functional sheets is required ("YES" at step S304), the procedure is branched to step S305. At step S305, to cancel the sample print output of functional sheets, a print process in a unit of one transfer sheet set with a functional sheet(s) is deleted from the print process for sample print output, and the procedure is then branched to step S306.

On the other hand, if it is determined that canceling a sample print output of functional sheets is not required ("NO") at step S304, the procedure is branched to step S306. At step S306, it is determined whether changing the paper type is required. If it is determined that changing the paper type is required ("YES" at step S306), the procedure is branched to step S307. At step S307, a paper-feed setting of the print process for sample print output is changed, and the procedure then goes to step S308. If it is determined that changing the paper type is not required at step S306, the procedure is branched to step S308.

At step S308, it is further determined whether adding a printable-character setting is required. If it is determined that adding a printable-character setting is required ("YES") at step S308, the procedure is branched to step S309. At step S309, the printable-character setting is added to the print process for sample output printing, and the procedure then goes to step S310. If it is determined that adding a printable-character setting is not required ("NO") at step S308, the procedure is branched to step S310. At step S310, an interrupt of a print process with the print settings through the control from step S300 to step S309 being reflected thereon is handled, and then the process routine ends at step S311. Here, if the print settings set in advance at the time of starting the print job include a print setting that cannot be processed at the specified paper-delivery destination, such a print setting can be canceled before interrupt at step S310. A print setting that can be processed at the specified paper-delivery destination is not canceled for sample print output. With this, a sample print output can be made in a state close to the final finishing.

With the user interfaces and the process routines, it is possible to specify, for the sample print output, at least one of: whether a paper-type change is required; a paper-type selection; whether a paper-feeding cassette change is required; a paper-feeding-cassette selection; whether canceling duplex printing is required; whether canceling combination printing is required; whether canceling a sample print output of a functional sheet is required; whether adding a printable-character setting is required; and a printable-character setting. With this, a sample print output can be made with flexible settings.

Figure 14:
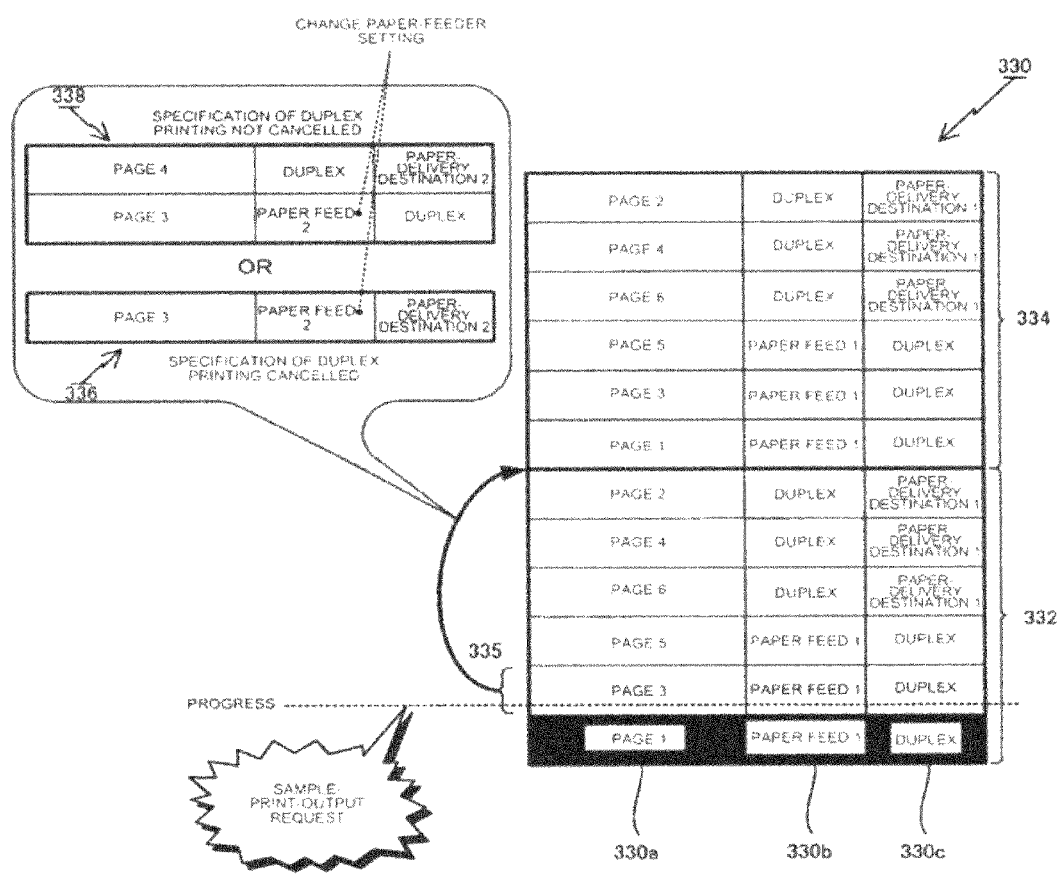
FIG. 14 is a drawing of a print job according to still another embodiment performed by the MFP.

FIG. 14 is a drawing of a print job according to still another embodiment performed by the MFP 100. A print job 330 depicted in FIG. 14 includes a field 330a schematically indicating page numbers, a field 330b in which specifications of paper feeders have been entered, and a field 330c in which specifications of paper-delivery destinations have been entered. The print job 330 corresponds to a case where images of six pages with two repeat copies are printed with duplex printing. The print job 330 includes print processes 332 and 334 in units of one copy. The print processes 332 and 334 each in a unit of one copy includes print processes of six pages in units of one transfer sheet. Also, the embodiment depicted in FIG. 14 corresponds to a case of a print process in a unit of one transfer sheet for sample print output.

In FIG. 14, a progress (T) of the print job is represented by a dotted line, and an example is depicted in which a sample-print-output request occurs during a print operation corresponding to the print process on the second page of the first copy. When the sample-print-output request is made at the progress (T), after the print operation corresponding to the on-going print process in a unit of one copy is completed, an interrupt of an interrupt print process corresponding to a print process 335 in a unit of one transfer sheet being executed at the time of sample print output request with the paper-delivery destination being changed is handled before the next-scheduled print process 334, thereby performing a sample print output. If canceling duplex printing at the time of sample print output is set as "required", an interrupt of a print process 336 with a specification of duplex printing being cancelled is handled. If canceling duplex printing at the time of sample print output is set as "not required", an interrupt of a print process 338 of duplex printing including a print process corresponding to the print process 335 for a rear side is handled, thereby performing a sample print output with duplex printing.

Figure 15:
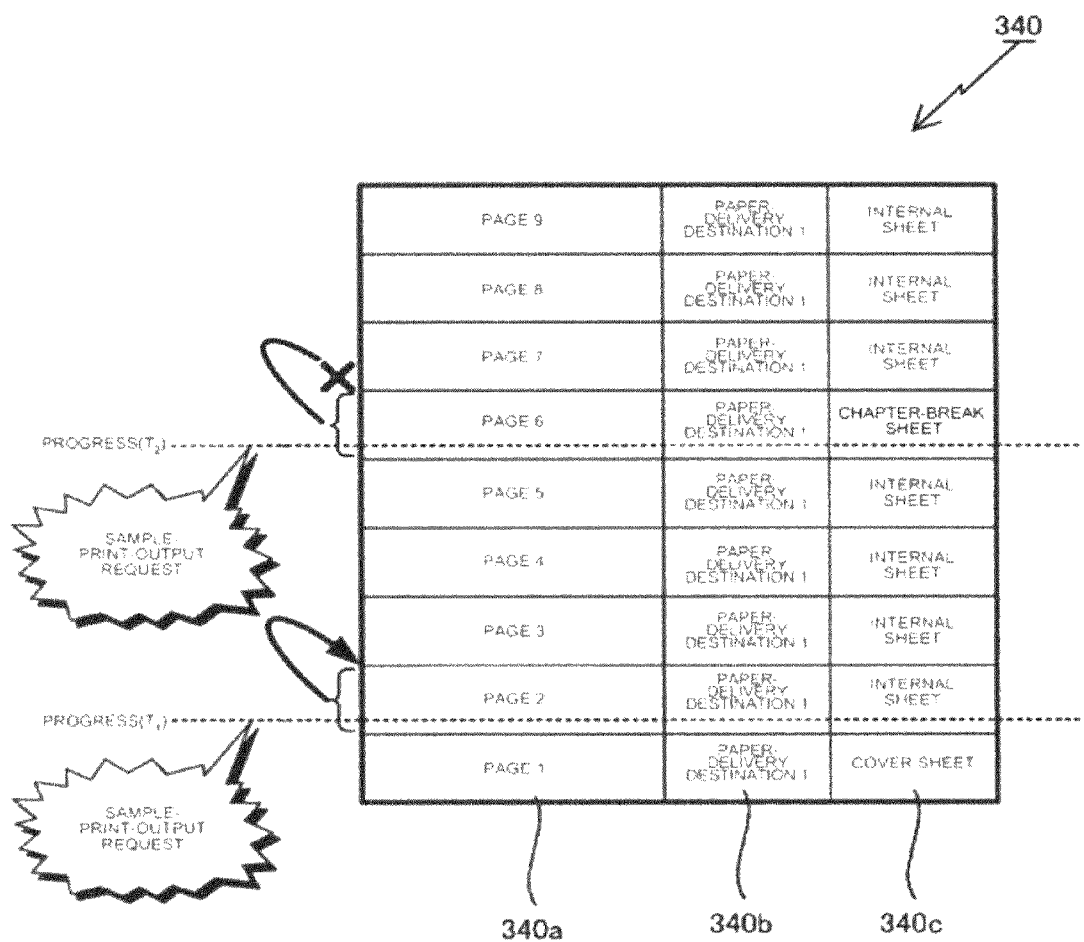
FIG. 15 is a drawing of a print job according to still another embodiment performed by the MFP.

An example of canceling a sample print output of functional sheets is explained below. FIG. 15 is a drawing of a print job according to still another embodiment performed by the MFP 100. A print job 340 depicted in FIG. 15 includes a field 340a schematically indicating page numbers, a field 340b in which paper-delivery destinations have been entered, and a field 340c in which functional-paper settings have been entered. The print job 340 corresponds to a case of printing images of nine pages with one repeat copy, with page 1 being set as a cover sheet and page 7 being set as a cover sheet, and a chapter-break sheet.

In FIG. 15, a progress ($T_1$) and a progress ($T_2$) of the print job are each represented by a dotted line, and an example is depicted in which a sample-print-output request occurs at the timing of these progresses. When a sample-print-output request occurs at the progress ($T_1$), since the functional-sheet setting for the second page is set as a normal internal sheet, a normal sample print output is performed. On the other hand, when a sample-print-output request occurs at the progress ($T_2$) and canceling a print output of functional papers is set as "required", since a chapter-break sheet is set to the sixth page as the functional sheet, the sample print output is cancelled.

Figure 16:
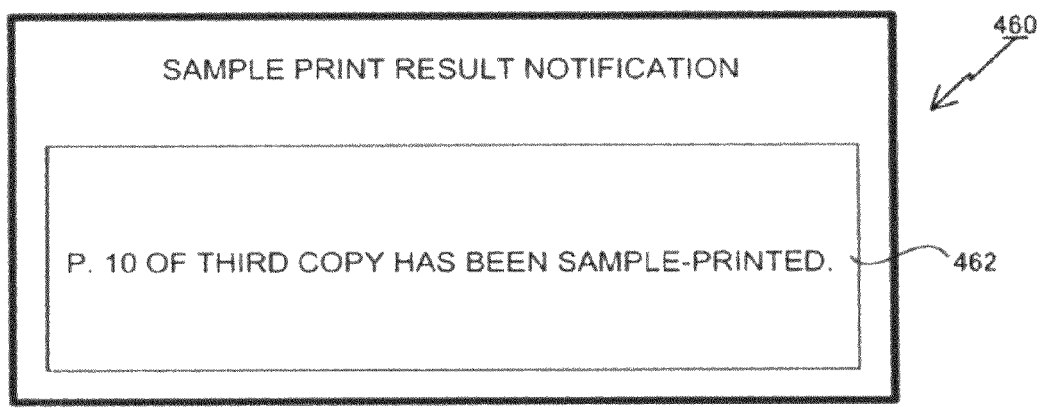
FIG. 16 is a drawing of a user notification screen displayed after a sample print output has been performed, according to an embodiment.

FIG. 16 is a drawing of a user notification screen displayed on a display screen of the operation panel 60 when a sample print output has been performed, according to an embodiment. A user notification screen 460 includes a message display 462 for notifying the user of a copy-count number and a page number corresponding to the predetermined print process for sample print output. Here, the user notification screen 460 can be displayed and controlled by the operation-panel controlling unit 36 upon completion of the sample print output, but this is not meant to be restrictive. For example, in another embodiment, the user notification screen 460 can be displayed on a display of a host computer through a predetermined interface other than the operation panel 60 of the MFP 100. In still another embodiment, the message can be printed for output as a service print at the paper-delivery destination for sample print output and other paper-delivery destinations. Notifying the user of the copy-count number and the page number corresponding to the predetermined print process for sample print output allows the user to know when the sample print output was performed, thereby making it possible to efficiently manage the finishing quality of the printed matter.

As has been explained above, according to the embodiments, an image forming apparatus, image forming system, program, and recording medium can be provided allowing a sample print output to be made in a unit as required, such as in a unit of one transfer sheet or in a unit of one copy, to the predetermined paper-delivery destination without suspending the print operation being executed, and also allowing the image quality of the printed matter and the post-process quality to be checked without decreasing productivity.

In the explanation, an MFP including a plurality of functions has been explained as one exemplary embodiment of the image forming apparatus. However, in the embodiments according to the present invention, the image forming apparatus can be configured as another image forming apparatus, such as a copier, a printing machine, or a printer.

The functions can be achieved by a computer-executable program written in a legacy programming language, such as assembler, C, C++, C#, or Java®, or an object-oriented programming language, and can be distributed as being stored in a device-readable recording medium such as ROM, electrically erasable programmable ROM (EEPROM), erasable programmable read-only memory (EPROM), flash memory, flexible disk, compact-disk ROM (CD-ROM), CD-rewritable (CD-RW), Digital Versatile Disk (DVD), SD card, or magneto-optical (MO) device.

While the embodiments of the present invention have been explained, these embodiments of the present invention are not meant to be restrictive. Other embodiments and changes, such as addition, modification, and deletion, are possible within a range that can be thought by one skilled in the art. Any embodiment can be included in the range of the present invention as long as the operation and effect of the present invention can be achieved.

The print process managing unit manages a print process divided into units of one transfer sheet or units of one copy, and also manages their execution schedule. The sample-print-output controlling unit causes an interrupt of a duplicate of a predetermined process during a print job as a print process for sample print output to be handled in the schedule, thereby achieving the sample print output. Also, the interrupt of the print process for sample print output can be handled after the print process being executed at the time of a sample-print-output request is completed.

With the configuration, sample print outputs to predetermined paper-delivery destinations can be performed in units as required, such as units of one transfer sheet or units of one copy, without suspending the printing operation being executed. With this, the image quality of and post-process quality of printed matter can be checked without decreasing productivity.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that selects a first paper-delivery destination and performs a print output at the first paper-delivery destination, the image forming apparatus comprising:
    a print-process managing unit that controls the print output and that divides a print job into a plurality of print processes, each print setting of the print job corresponding to one of the plurality of print processes, the plurality of print processes being executed for each duplicate instance of the print job; and
    a sample-print-output controlling unit that controls execution of a sample print output by generating, in response to a sample-print-output request that is received while the print job is executing, an interrupt of a scheduled print process and outputting the sample print output that is a duplicate of a scheduled print process to a second paper-delivery destination changed by the print-process managing unit;
    wherein the scheduled print rocess is either one of a print process scheduled to be started after a time point at which the sample-print-output request is received and a print process that is being executed at a time point at which the sample-print-output request is received.

2. The image forming apparatus according to claim 1, wherein the scheduled print process is either one of a print process in a unit of one transfer sheet and a print process in a unit of a copy set.

3. The image forming apparatus according to claim 1, wherein, when the scheduled print process includes an edit setting, the sample-print-output controlling unit determines whether the edit setting is to be cancelled, and the edit setting includes either one of a specification of duplex printing and a specification of combination printing.

4. The image forming apparatus according to claim 1, wherein, when the scheduled print process includes a functional-sheet setting, the sample-print-output controlling unit determines whether a print process subjected to the functional-sheet setting is to be deleted from duplicate instances of the scheduled print process.

5. The image forming apparatus according to claim 1, wherein the sample-print-output controlling unit changes a sheet setting in the duplicate of the scheduled print process, and the sheet setting includes either one of a specification of a paper feeding tray and a specification of a paper type.

6. The image forming apparatus according to claim 1, wherein the sample-print-output controlling unit further adds a printable-character setting to duplicate instances of the scheduled print process, and the printable-character setting includes either one of a specification of printing a stamp, a specification of printing a page number, and a specification of printing a copy-count number.

7. The image forming apparatus according to claim 1, further comprising a notifying unit that notifies a user of at least either one of a copy-count number and a page number corresponding to the scheduled print process of the interrupt when the sample print output is executed.

8. The image forming apparatus according to claim 1, further comprising a user interface unit configured to specify, for the sample print output, at least one of:
 a unit of the scheduled print process; whether a paper-type change is required;
 a paper-type selection; whether a paper-feeding cassette change is required; a paper-feeding -cassette selection; whether canceling duplex printing is required, whether canceling combination printing is required; whether canceling a sample print output of a functional sheet is required; whether adding a printable-character setting is required; and a printable -character setting.

9. An image forming system comprising:
 the image forming apparatus according to claim 1; and
 either one of a stacker device and a finisher device that provides the paper-delivery destination of a transfer member receiving the print output by the image forming apparatus.

10. A method of printing a sample print on an image forming apparatus that selects a paper-delivery destination, the method comprising:
 dividing a print job into a plurality of print processes, each print setting of the print job corresponding to one of the plurality of print processes, the plurality of print processes being executed for each duplicate instance of the print job;
 controlling a print output; and
 controlling execution of a sample print output by generating in response to a sample-print-output request that is received while the print job is executing, an interrupt of a scheduled print process and outputting the sample print output that is a duplicate of the scheduled print process to a selected paper-delivery destination, the selected paper-delivery destination being selected at the dividing;
 wherein the scheduled print process is either one of a print process scheduled to be started after a time point at which the sample-print-output request is received and a print process that is being executed at a time point at which the sample-print-output request is received.

11. A non-transitory computer-readable storage medium having computer readable program codes embodied in the computer readable storage medium that, when executed cause a computer to execute printing a sample print on an image forming apparatus that selects a paper-delivery destination, the computer readable program codes causing the computer to execute:
 dividing a print job into a plurality of print processes, each print setting of the print job corresponding to one of the plurality of print processes, the plurality of print processes being executed for each duplicate instance of the print job;
 controlling a print output; and
 controlling execution of a sample print output by generating in response to a sample-print-output request that is received while the print job is executing, an interrupt of a scheduled print process and outputting the sample print output that is a duplicate of the scheduled print process to a selected paper-delivery destination, the selected paper-delivery destination being selected at the dividing;
 wherein the scheduled print proprocess is either one of a print process scheduled to be started after a time point at which the sample-print-output request is received and a print process that is being executed at a time point at which the sample-print-output request is received.

12. An image forming apparatus that selects a first paper-delivery destination and performs a print output at the first paper-delivery destination, the image forming apparatus comprising:
 a print-process managing means that controls the print output and that divides a print job into a plurality of print processes, each print setting of the print job corresponding to one of the plurality of print processes, the plurality of print processes being executed for each duplicate instance of the print job; and
 a sample-print-output controlling means that controls execution of a sample print output by generating in response to a sample-print-output request that is received while the print job is executing, an interrupt of a scheduled print process and outputting the sample print output that is a duplicate of the scheduled print process to a second paper-delivery destination that is changed by the print-process managing means;
 wherein the scheduled print process is either one of a print process scheduled to be started after a time point at which the sample-print-output request is received and a print process that is being executed at a time point at which the sample-print-output request is received.

13. The image forming apparatus according to claim 1, further comprising:
 a two-stage inserter that includes at least one tray that sets an insertion sheet between consecutive items of the print output.

14. The image forming apparatus according to claim 12, further comprising:
 a two-stage inserter that includes at least one tray that sets an insertion sheet between consecutive items of the print output.

15. The image forming apparatus according to claim 1, wherein the print job is specified by a plurality of print settings that are applied to each duplicate instance of the print job, and the scheduled print process corresponds to one of the plurality of print settings that is applied to each duplicate instance of the print job.

* * * * *